US009117439B2

(12) United States Patent
Bercoff et al.

(10) Patent No.: US 9,117,439 B2
(45) Date of Patent: Aug. 25, 2015

(54) METHOD AND APPARATUS FOR ULTRASOUND SYNTHETIC IMAGINING

(75) Inventors: Jeremy Bercoff, Aix En Provence (FR); Claude Cohen Bacrie, Ventabren (FR); Mickael Tanter, Bagneux (FR); Mathias Fink, Meudon (FR); Gabriel Montaldo, Paris (FR)

(73) Assignee: Supersonic Imagine, Aix en Provence Cedex (FR)

( * ) Notice: Subject to any disclaimer, the term of this patent is extended or adjusted under 35 U.S.C. 154(b) by 1167 days.

(21) Appl. No.: 12/047,645

(22) Filed: Mar. 13, 2008

(65) Prior Publication Data

US 2009/0234230 A1   Sep. 17, 2009

(51) Int. Cl.
*A61B 8/00* (2006.01)
*G10K 11/34* (2006.01)
*G01S 7/52* (2006.01)
*G01S 15/89* (2006.01)

(52) U.S. Cl.
CPC ........... *G10K 11/346* (2013.01); *G01S 7/52049* (2013.01); *G01S 15/8977* (2013.01); *G01S 15/8997* (2013.01)

(58) Field of Classification Search
USPC ................................. 600/407, 437, 443–447
See application file for complete search history.

(56) References Cited

U.S. PATENT DOCUMENTS

| | | | |
|---|---|---|---|
| 6,251,073 B1 | 6/2001 | Imran et al. | |
| 6,309,356 B1 | 10/2001 | Ustuner et al. | |
| 6,517,499 B1 | 2/2003 | Pereira | |
| 6,524,248 B1 * | 2/2003 | Bullis | 600/437 |
| 6,551,246 B1 | 4/2003 | Ustuner et al. | |
| 6,569,102 B2 | 5/2003 | Imran et al. | |
| 6,682,487 B1 | 1/2004 | Savord | |
| 6,685,641 B2 | 2/2004 | Liu | |
| 6,685,645 B1 | 2/2004 | McLaughlin et al. | |

(Continued)

FOREIGN PATENT DOCUMENTS

| | | |
|---|---|---|
| EP | 1777543 A2 | 8/2005 |
| EP | 1 777 543 | 4/2007 |

(Continued)

OTHER PUBLICATIONS

J.C. Lacefield, et al. Spatial coherence analysis applied to aberration correction using a two-dimensional array system. The Journal of the Acoustical Society of America—Dec. 2002 00 vol. 112, Issue 6, pp. 2558-2566.

(Continued)

*Primary Examiner* — Joel F Brutus
(74) *Attorney, Agent, or Firm* — Miller Matthias & Hull LLP

(57) ABSTRACT

A method for ultrasound imaging is provided. The method includes at least a transmission step, a coherence enhancing step, and a beamforming step. In the transmission step, a plurality of ultrasonic waves are transmitted into an imaged region and a set of raw data is acquired by an array of transducers in response to each ultrasonic wave. The ultrasonic waves have different spatial frequency content. In the coherence enhancing step, for each of a plurality of virtual transmit focal zones in the imaged region, at least one set of coherent data is synthesized from the sets of raw data. In the beamforming step, for each of a plurality of locations included in each of the virtual transmit focal zones, an image pixel is computed by beamforming, using the set of coherent data.

24 Claims, 2 Drawing Sheets

(56) References Cited

U.S. PATENT DOCUMENTS

| | | | |
|---|---|---|---|
| 6,736,780 B2 | 5/2004 | Song et al. | |
| 6,773,399 B2 | 8/2004 | Xi et al. | |
| 6,896,658 B2 | 5/2005 | Ji et al. | |
| 7,238,157 B2 | 7/2007 | McLaughlin et al. | |
| 2002/0045821 A1* | 4/2002 | Tsuzuki | 600/443 |
| 2003/0078498 A1* | 4/2003 | Lang et al. | 600/437 |
| 2004/0006272 A1 | 1/2004 | Vortman et al. | |
| 2005/0154306 A1* | 7/2005 | Burcher et al. | 600/447 |
| 2005/0231294 A1 | 10/2005 | Luzzi | |
| 2006/0173313 A1 | 8/2006 | Liu et al. | |
| 2006/0241429 A1* | 10/2006 | Ustuner et al. | 600/437 |
| 2006/0287596 A1* | 12/2006 | Johnson et al. | 600/437 |
| 2006/0293596 A1* | 12/2006 | Jago et al. | 600/437 |
| 2007/0161904 A1* | 7/2007 | Urbano | 600/459 |
| 2012/0083695 A1* | 4/2012 | Napolitano et al. | 600/443 |

FOREIGN PATENT DOCUMENTS

| | | |
|---|---|---|
| JP | H08-317926 A | 3/1996 |
| JP | 2002143153 A | 5/2002 |
| JP | 2005-046193 A | 2/2005 |
| JP | H09-224938 | 9/2005 |
| JP | 2006-204923 A | 8/2006 |

OTHER PUBLICATIONS

F. Viola, et al. A comparison of the performance of time-delay estimators in medical ultrasound. IEEE Transactions on Ultrasonics Ferroelectrics and Frequency Control 50 (4): 392-401 Apr. 2003.

C. Prada, et al. Experimental subwavelength localization of scatterers by decomposition of the time reversal operator interpreted as a covariance matrix. Journal of the Acoustical Society of America 114 (1) 235-243 Jul. 2003.

C. Prada, et al. Decomposition of the time reversal operator: Detection and selective focusing on two scatterers. Journal of the Acoustical Society of America 99 (4): 2067-2076 Part 1 Apr. 1996.

European Search Report from European Patent Application No. EP09153358; Report dated May 11, 2011.

Canadian Office Action from Canadian Patent Application No. 2,658,063; Office Action dated Jun. 7, 2011.

Japanese Office Action issued in related Japanese Patent Application No. JP 2009-061469; Action dated Aug. 5, 2014.

* cited by examiner

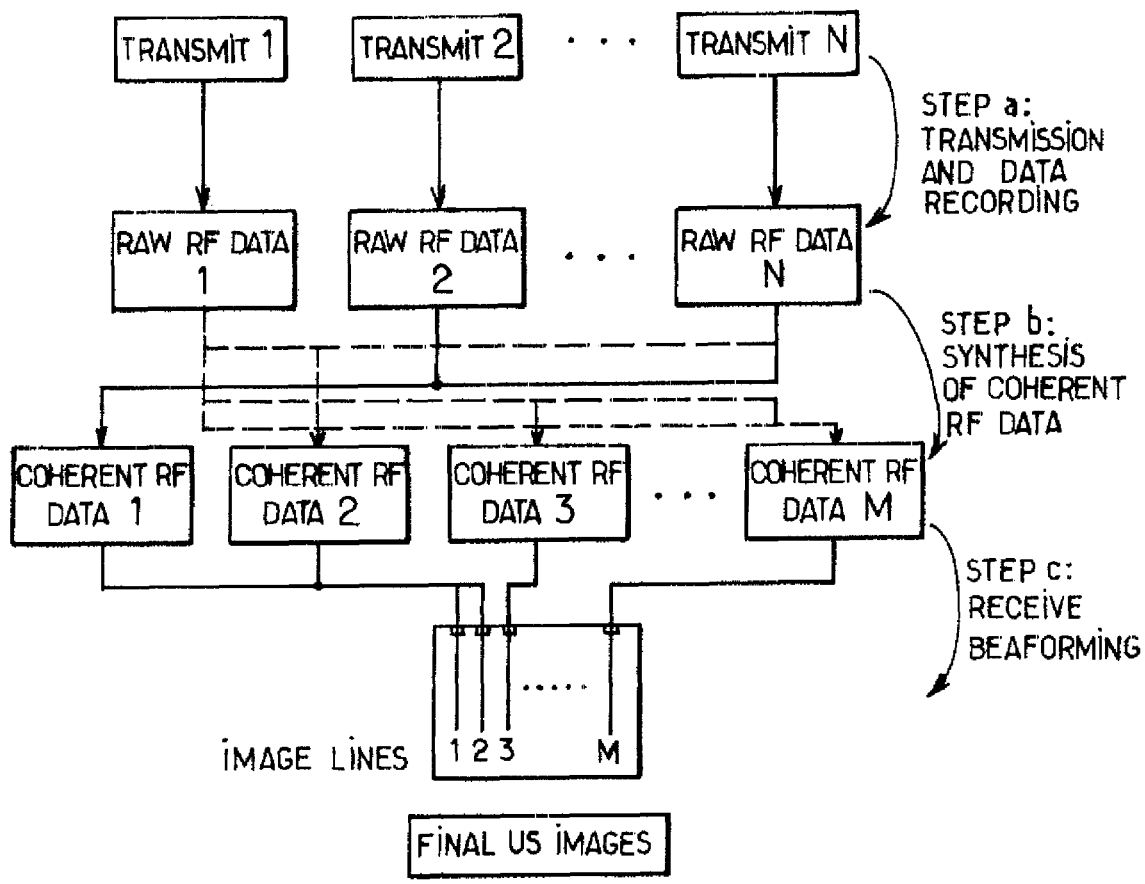

METHOD AND APPARATUS FOR ULTRASOUND SYNTHETIC IMAGING

FIELD OF THE INVENTION

The invention relates to methods and apparatus for ultrasound synthetic imaging, in particular for medical imaging.

BACKGROUND OF THE INVENTION

Ultrasound Standard Imaging

Standard ultrasound imaging consists of an insonification of the medium with a cylindrical wave that focuses on a given point. Using the backscattered echoes of this single insonification, a complete line of the image is computed using a dynamic receive beamforming process. To build a complete image, this procedure is repeated by sending a set of focused waves that scan along a lateral line at given depth (named the focal plane). For each focused wave, a dynamic beamforming is performed and the complete image is obtained line by line. The dynamic beamforming guarantees a uniform focusing in the receive mode, whereas, in the transmit mode the focus is fixed at a given depth. The final image is optimal in the focal plane and in a limited region of the medium corresponding to the focal axial length. However, outside this area which is imposed by diffraction laws, the image quality is rapidly degraded at other depths (in the near and far fields of the focused beam).

To overcome this limitation, a classical solution is to perform multi-focus imaging: different transmit focal depths are used to obtain a homogeneous quality all over the image. Each transmission at a given focal depth enables performing a partial image in the region delimited by the axial focal length. The final image is obtained using a recombination of these partial images corresponding to various depths. An optimal multi-focus image requires typically tens of focal planes. This leads to frame rate limitations, typically <10 frames/second, that are not acceptable for ultrasound imaging. A good compromise between image quality and frame rate is around 4 focal depths images.

Ultrasound Synthetic Imaging

Improvement in image quality can be envisioned by performing synthetic dynamic transmit focalization. Such approach consists in re-synthesizing a dynamic transmit focusing (i.e. as many focal depths as pixel in the image) by beamforming and then combining a set of different insonifications.

Two main implementations can be considered: Synthetic aperture and coherent plane wave compound.

i) Synthetic Aperture

In the synthetic aperture approach, the ultrasonic array is fired element by element, and the complete set of impulse responses between each transmit and receive element is beamformed and recorded, as disclosed for instance in U.S. Pat. No. 6,689,063. It is then possible to post-process these data in order to generate a synthetic image relying on both transmit and receive focusing for each pixel of the image. It has been intensely discussed in the literature whether synthetic imaging could give better images than conventional B-mode images, and how they will be affected by tissue motion and limited signal-to-noise ratio. A fundamental problem in synthetic aperture imaging is the poor signal-to-noise ratio in the images, since a single element is used for emission. This gives a much lower emitted energy compared to using the full aperture in conventional imaging and therefore limits the depth of penetration.

ii) Synthetic Plane Wave Approach

Synthetic plane wave imaging is an approach that solves at least partially the limitations of synthetic aperture imaging. It consists in transmitting plane waves of different angles in the medium, beamforming in receive the backscattered signal then combine the different image to re-synthesize to final image, as disclosed for instance in U.S. Pat. No. 6,551,246. The transmission of a plane wave on the complete array generates a much higher pressure field than in the synthetic aperture approach. Moreover, diffraction and attenuation effects during propagation in soft tissues are significantly lower for an ultrasonic plane wave compared to a single element transmission.

Synthetic dynamic transmit focusing approaches push the boundaries of the classical Image Quality/Frame rate compromise. Optimal image qualities can be obtained at higher frame rates (>10 Hz).

However, the currently known synthetic ultrasound imaging methods which use the plane wave approach still need to be improved in terms of accuracy of the image.

OBJECTS AND SUMMARY OF THE INVENTION

One objective of the present invention is to propose a new synthetic ultrasound imaging method which enables to improve the past plane wave synthetic ultrasound imaging methods.

To this end, according to an embodiment of the invention, a method for ultrasound imaging is provided which comprises at least the following steps:
 a) a transmission step in which a plurality of ultrasonic waves are transmitted into an imaged region and a respective set of raw data is acquired by an array of transducers in response to each ultrasonic wave, said ultrasonic waves having different spatial frequency content, for each of a plurality of imaged locations in the region, each set of raw data representing the time signals received by the transducers in response to the corresponding ultrasonic wave;
 b) a coherence enhancing step in which, for each of a plurality of virtual transmit focal zones in the imaged region, at least one set of coherent data is synthesized from the sets of raw data;
 c) a beamforming step in which, for each of a plurality of locations included in each of the virtual transmit focal zones, an image pixel is computed by beamforming, using the set of coherent data.

Thanks to these dispositions, the spatial coherence of the raw data is recovered at step b) prior to beamforming, thus enabling to accurately combine the data received from the transmission of the various ultrasonic waves. The need to recover spatial coherence is due the fact that, when illuminating the imaged region with spatially widely spread wavefield, the echoes coming back from the medium can be seen as a wavefield originating from incoherent sources (the scatterers) randomly distributed in the imaged region: thus, the spatial coherence of the wavefield is lost (or very poor) in the raw data.

The beamforming may then be performed on the coherent data resulting from the coherence recovery step, thus resulting in a more accurate image.

On the contrary, in the prior art synthetic ultrasound imaging methods, the beamforming was first performed on the raw data and the resulting images corresponding to the various plane waves were later combined, but a lot of information is lost in the beamforming process and the combination of images as performed in the prior art did not enable to recover a spatial coherence.

In various embodiments of the method for ultrasound imaging according to the above embodiment of the invention, one may possibly have recourse in addition to one and/or other of the following arrangements:

the ultrasonic waves are plane waves having different propagation directions;
the ultrasonic waves are divergent waves having different propagation directions;
the ultrasonic waves are spatio-temporal coded excitations;
the coherence enhancing step is performed using a fixed sound speed value;
the coherence enhancing step includes a global sound speed value estimation of the imaged region;
the coherence enhancing step includes global sound speed estimation for each imaged location of the region;
the coherence enhancing step includes phase aberration corrections;
in the coherence enhancing step, each virtual transmit focal zone is a straight line perpendicular to the transducer array;
the coherence enhancing step includes:
    a first substep of computing a coherent data set for each virtual transmit focal zone by applying delays to the raw data for performing a virtual dynamic transmit focusing on said virtual transmit focal zone, assuming that the speed of sound is homogeneous in the region;
    a second substep in which said delays are corrected by an estimation of aberrations in the imaged region based on the coherent data set calculated at the first substep, and the corrected delays are used to compute a new coherent data set by performing a virtual dynamic transmit focusing on said virtual transmit focal zone;
at least said second substep (i.e. the second substep or both first and second substeps) is performed several times;
in said second substep, the estimation of aberrations is done by cross correlating the coherent data corresponding to different transducers in each coherent data set.

Another object of the present invention is an apparatus for ultrasound imaging, comprising:

means for transmitting a plurality of ultrasonic waves into a region, said ultrasonic waves having different spatial frequency content, for each of a plurality of imaged locations in the region;
means for acquiring a respective set of raw data is acquired in response to each ultrasonic wave;
means for synthesizing at least one set of coherent RF data is synthesized from each set of raw data for each of a plurality of virtual transmit focal zones in the region;
beamforming means for computing a beamformed signal along at least one direction using the set of coherent data for each of a plurality of locations included in each of the virtual transmit focal zones.

BRIEF DESCRIPTION OF THE DRAWINGS

Other features and advantages of the invention appear from the following detailed description of one embodiment thereof, given by way of non-limiting example, and with reference to the accompanying drawings.

In the drawings:

FIG. 3 is a diagram illustrating a synthetic ultrasound imaging method which can be implemented by the apparatus of FIGS. 1 and 2.

MORE DETAILED DESCRIPTION

In the Figures, the same references denote identical or similar elements.

Figure 1:
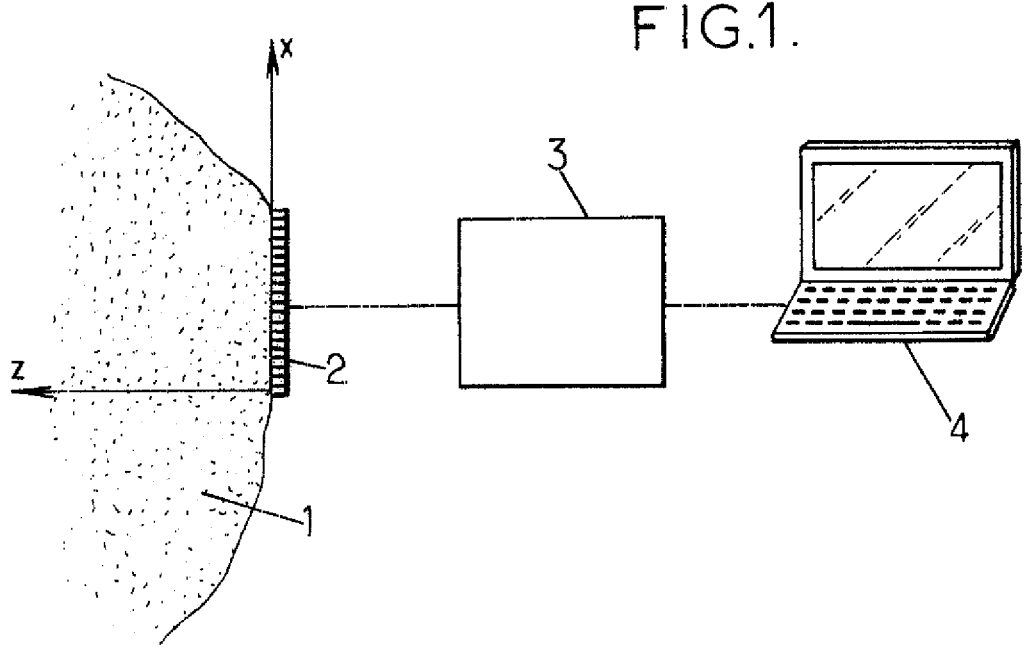
FIG. 1 is a schematic drawing showing a synthetic ultrasound imaging apparatus according to one embodiment of the invention.

The apparatus shown on FIG. 1 is adapted for synthetic ultrasound imaging of a region 1, for instance living tissues and in particular human tissues of a patient. The apparatus may include for instance:

an ultrasound transducer array 2, for instance a linear array typically including a few tens of transducers (for instance 100 to 300) juxtaposed along an axis X as already known in usual echographic probes (the array 2 is then adapted to perform a bidimensional (2D) imaging of the region 1, but the array 2 could also be a bidimensional array adapted to perform a 3D imaging of the region 1);
an electronic bay 3 controlling the transducer array and acquiring signals therefrom;
a microcomputer 4 for controlling the electronic bay 3 and viewing ultrasound images obtained from the electronic bay (in a variant, a single electronic device could fulfill all the functionalities of the electronic bay 3 and of the microcomputer 4).

Figure 2:
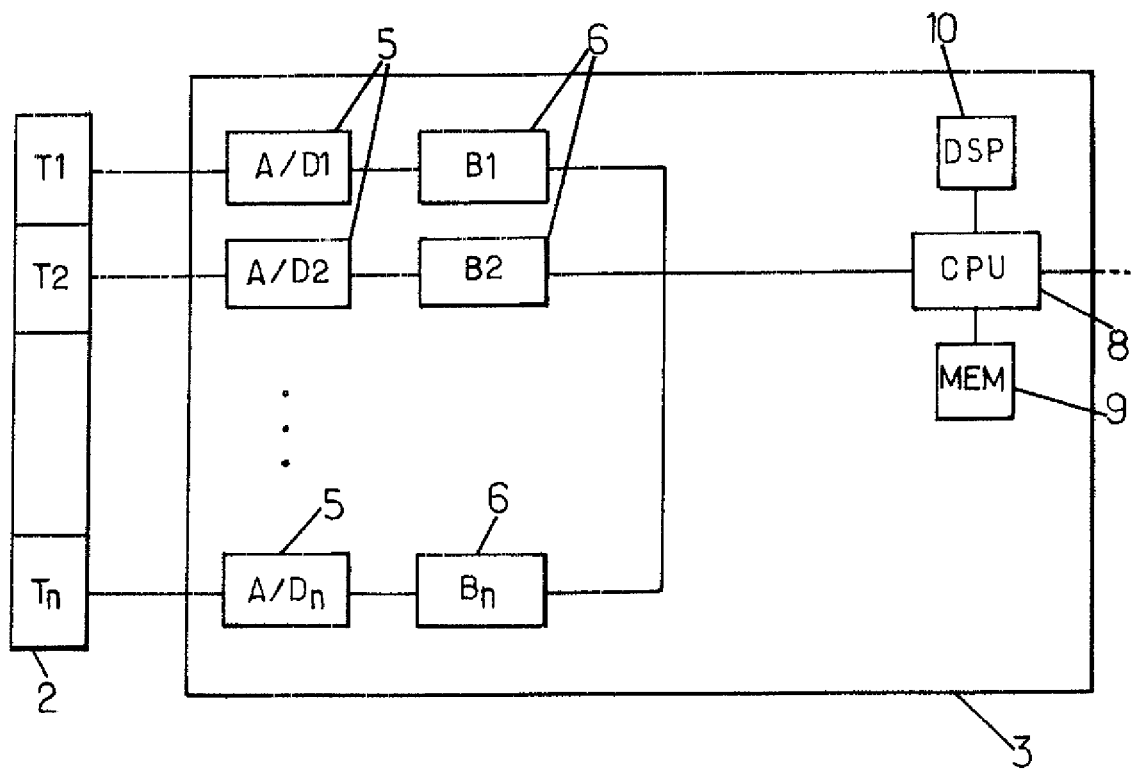
FIG. 2 is a block diagram showing part of the apparatus of FIG. 1.

As shown on FIG. 2, the electronic bay 3 may include for instance:

n analog/digital converters 5 ($A/D_1$-$A/D_n$) individually connected to the n transducers ($T_1$-$T_n$) of the transducer array 2;
n buffer memories 6 ($B_1$-$B_n$) respectively connected to the n analog/digital converters 5,
a central processing unit 8 (CPU) communicating with the buffer memories 6 and the microcomputer 4,
a memory 9 (MEM) connected to the central processing unit 8;
a digital signal processor 10 (DSP) connected to the central processing unit 8.

FIG. 3 shows one example of implementation of the method of the present invention with the apparatus of FIGS. 1 and 2, including three main steps:

a) Transmission and data recording;
b) Synthesis of coherent RF data;
c) Receive beamforming.

These method steps are controlled mainly by the central processing unit 7 with the help of the digital signal processor 9.

Step a: Transmission and Data Recording

The transducer array is put in contact with the medium to be imaged (e.g. a patient's body), and a number N of tilted ultrasound plane waves are successively sent in the region 1 by the transducer array 2. The number N of the tilted plane waves may be comprised for instance between 2 and 100. The frequency of the ultrasound waves may be comprised for instance between 0.5 and 100 MHz, for instance between 1 and 10 MHz.

Each tilted plane wave is characterized by the angle α of inclination of its direction of propagation with regard to axis Z (axis Z is perpendicular to the axis X of the linear transducer array 2 and defines the imaging plane with axis X).

Each tilted plane wave encounters a number of scatterers (speckle) and is backscattered to the transducer array 2, so that each transducer $T_1$-$T_n$ of the array receives a backscattered signal. The backscattered signals of the n transducers are then respectively digitized by the analog-digital converters 5 and memorized in the n buffer memories 6. The data stored in the n buffer memories after transmission of one plane wave will be called hereafter the raw RF data. Thus, the raw RF data can be considered as a matrix which is representative of the time signals received by all the transducers of the array 2 after transmission of a plane wave "RF" is a usual term in the art and just refers to the frequency of the ultrasound wave (usually in the range of 0.5 to 100 Mhz), but this expression is not limitative in any way.

It should be noted that the ultrasonic plane waves could also be replaced by divergent ultrasonic waves having different propagation directions.

In all cases, the ultrasonic waves could be spatio-temporally coded, for instance to enable a simultaneous transmission and treatment of several ultrasonic waves of different directions.

Step b: Synthesis of Coherent RF Data

From the N acquired raw RF data matrices, M coherent synthetic RF data matrices are computed using stretching time delaying and summing processes. Each one of the M computed matrices corresponds to the backscattered echoes resulting from a given virtual dynamic transmit focusing line. This may be achieved following the processes described below.

1) Substep b.1: Synthetize a First Set of Coherent RF Data Assuming a Constant Speed of Sound in the Whole Medium.

For sake of simplicity we take here as a convention that the wavefield is emitted at time t=0 on the transducer located at $\{x=0, z=0\}$. Let us consider a virtual transmit focus location $F(x_1, z)$. If the medium is insonified using a plane wave with inclination $\alpha$, the time needed for the wave to reach the location $F(x_1,z)$ in the medium is:

$$\tau_{ec}(\alpha,x_1,z)=(z \cos \alpha + x_1 \sin \alpha)/c, \quad (1)$$

where $x_1$ and z are abscises along axes X and Z and c is the speed of sound in the region 1. The speed of sound c may be a predetermined value, or a global estimated value.

The time needed to come back to a given transducer placed in x is:

$$\tau_{rec}(x_1,x,z)=\sqrt{z^2+(x-x_1)^2}/c. \quad (2)$$

The total travel time $\tau$ for a steered plane wave insonification is then:

$$\tau(\alpha, x_1, x, z) = \tau_{ec} + \tau_{rec} = \frac{1}{c}\left[(z\cos\alpha + x_1\sin\alpha) + \sqrt{z^2 + (x-x_1)^2}\right] \quad (3)$$

The total travel time gives the link between the raw RF data (RFraw $(x,z,\alpha)$) and the spatially coherent RF Data (RFcoherent$(x_1,x,z)$) for the virtual transmit focus location $F(x_1,z)$ considered:

$$RFcoherent(x_1, x, z) = \sum_\alpha B(\alpha) RFraw(x, \tau(\alpha, x_1, x, z), \alpha) \quad (4)$$

where $B(\alpha)$ is a weighting function for each angle contribution. A virtual focalization line is defined by all the virtual focus point $F(x_1,z)$ with the same lateral position $x_1$. Each virtual focalization line along a given line $x_1$ is represented by a 2D coherent RF data matrix: the matrix RFcoherent$(x_1,x,z)$.

M of those coherent RF data matrices are computed, M being the number of virtual transmit focalization lines that needs to be computed (i.e. for M values of $x_1$).

M might for example correspond to the number of transducers in the array 2, or might be a larger number.

2) Substep b.2: Determine the Correct Focalization Laws of the Medium by Correcting the Aberrations Potential aberrations of the medium that could distort the ultrasound wave propagation are not taken into account in the previous calculation. Those local aberrations may be constituted by local changes of acoustic properties such as speed of sound, density or sound absorption (In medical ultrasound, such heterogeneities exists as sound speed ranges roughly from 1460 m·s$^{-1}$ for fat to 1560 ms$^{-1}$ for muscle). Such aberrations introduce errors that degrade the spatial coherency of the synthesized signal and the quality of the final ultrasound image.

In order to correct such errors, known aberration correction methods can be used. By applying these methods to the coherent synthetic RF data coming from line $x_1$, the corrected focusing law described by a set of time delays $\delta(x_1,x,z)$ can be estimated and added to the different travel times:

$$\tau_{new}(\alpha,x_1,x,z)=\tau(\alpha,x_1,x,z) \quad (5)$$

where $\delta$ is the delay correction for the error induced by assuming a cylindrical focalization law.

The M coherent synthetic data matrices of step b.1 are the computed again using $\tau_{new}(\alpha, x_1, x, z)$ as a new value of $\tau(\alpha, x_1, x, z)$ in formula (4).

These phase aberration corrections are equivalent to a local estimation of the sound speed for each imaged location of the region 1.

Aberration correction methods rely on the spatial coherency of the recorded wavefield.

The spatial coherency of a wavefield is measured by its spatial covariance. It measures the correlation between the values of a field sensed at two points as a function of their spacing. This correlation function corresponds to the second order statistics of the spatial fluctuations of the wavefield produced by an incoherent source.

One of the major theorems of optics, the so-called Van Cittert-Zernike theorem, describes these second order statistics of such field. The Van Cittert-Zernike theorem says that the spatial covariance of the field sensed at two points Xi and X2 of an observation plane is equal to the Fourier transform of the source aperture function taken at spatial frequency (X2−X1)/$\lambda$z where $\lambda$ is the wavelength and z is the distance between the source and the observation plane.

As a direct consequence, the sharper is the incoherent source spot, the larger is the area in the observation plane where the field sensed at two different points has a high similarity.

Aberration corrections techniques in medical ultrasound imaging are mainly based on this consequence. Indeed, if the field recorded on an array of transducers is corresponding to the backscattered echoes coming from a set of incoherent sources located in a small spatial spot (focal spot), then the field received on one element of the array will have high similarity with the field received on neighbouring elements. Then, a simple crosscorrelation between signals received on neighbouring elements enables recovering the time delay between these signals. Applying this concept to the whole set of array elements permits to find the set of time delays between all elements and thus to fully describe the aberrating medium (aberrations corrections techniques make the assumption that the aberrating layer is thin located close to the array and introduces only time shifts on the elements of the array: the well known "phase screen approximation").

3) Eventually, Reiterate Substep b.2

Eventually, step b.2 may then be reiterated. The number of reiterations may be predetermined, or stopping the reiterations may be subject to an error value interior to a predetermined limit. The error value may be for instance: $E=\Sigma\delta(x_1, x, z)^2$, or else.

Instead of reiterating only substep b.2, it is possible to reiterate both substeps b.1 and b.2 in order to refine the estimate of the delay laws.

Step c: Receive Beamforming

After step b), a receive beamforming is then performed on each of the M coherent RF data matrices to compute the final ultrasonic image. The delay law used is the one calculated by the aberration correction method:

A point $(x_1, z)$ of the image is obtained by adding coherently the contribution of each scatterer, that is to say delaying the $RF_{x_1}(x, t)$ signals by $\tau new(x_1, x, z)$ and adding them in the array direction X:

$$s(x_1, z) = \int A(x_1, x) \times RF_{x_1}(x, \tau new(x_1, x, z)) dx \quad (6)$$

where A is the receive apodization function as a function of x for the building of line $x_1$ in the final image.

The image thus comprises M lines.

Variants

It is possible to improve the variance of the aberration distortions estimates, by slightly refining the previous implementation.

In step b, each one of the M computed matrices corresponds to the backscattered echoes resulting from a given virtual dynamic transmit focusing line obtained by summing over the raw per channel data for different angles α.

However, in some cases, it is interesting for step b of the implementation to synthesize K independent versions of the same matrix corresponding to one given line $x_1$.

For example, such independent versions can be built easily by using for each version only a different and reduced set of angles α.

Another way to acquire K independent versions of the same matrix corresponding to one given line $x_1$ consists in modifying step a: the N tilted plane waves can be sent for successive subsets of transducers of the array (i.e. successive subapertures). Then, in step 2, the K versions of the virtual matrix corresponding to line $x_1$ are built using the set of N raw RF data acquired from different subapertures of the array.

The estimation of the aberrations distortions $\delta(x_1, x, z)$ in step b.2 can then be improved as these aberrations should be the same for the K different versions of the matrix corresponding to the virtual line $x_1$. Thus, simply averaging $\delta(x_1, x, z)$ for K different versions of the same matrix will reduce the variance of the estimates.

More complex recombinations such as DORT techniques can also be performed (see for instance: Prada C, Thomas J L. *Experimental subwavelength localization of scatterers by decomposition of the time reversal operator interpreted as a covariance matrix. JOURNAL OF THE ACOUSTICAL SOCIETY OF AMERICA* 114 (1): 235-243 JULY 2003, and Prada C, Manneville S, Spoliansky D, et al. *Decomposition of the time reversal operator: Detection and selective focusing on two scatterers. JOURNAL OF THE ACOUSTICAL SOCIETY OF AMERICA* 99 (4): 2067-2076 Part 1 April 1996).

The method according to the invention may be used for instance:

to perform at least one 2D or 3D ultrasound image dynamically focused in transmit and receive;

to perform at set of steered ultrasound image dynamically focused in transmit and receive that can be incoherently summed to produce a compounded image;

to perform at least one 2D or 3D ultrasound image and one 2D or 3D color flow image both dynamically focused in transmit and receive;

to perform at least one 2D or 3D high quality ultrasound tissue harmonic image;

to perform at least one 2D or 3D high quality ultrasound contrast image using injected contrast agents;

to perform at least one 2D or 3D ultrasound image dynamically focused in transmit and receive and combined with other classical modes such as focused color flow or harmonic imaging.

The invention claimed is:

1. An apparatus for ultrasound imaging, comprising:

means for transmitting a plurality of ultrasonic tilted plane waves into a region, said ultrasonic tilted plane waves having different mean angles of inclination of their directions of propagation, for each of a plurality of imaged locations in the region;

means for acquiring respective sets of non-coherent raw data, without receive beamforming, in response to said ultrasonic tilted plane waves, each set of non-coherent raw data representing the time signals respectively received by an array of transducers in response to the corresponding ultrasonic tilted plane wave;

means for synthesizing at least one set of coherent raw data from the plurality of sets of non-coherent raw data for each of a plurality of virtual transmit focal zones in an imaged region, the at least one set of coherent raw data corresponding to backscattered echoes resulting from said virtual transmit focal zone and being synthesized by coherent addition of said respective sets of non-coherent raw data corresponding to the different mean angles of inclination of the directions of propagation of the ultrasonic tilted plane waves;

beamforming means for computing a beamformed signal by receive beamforming along at least one direction using the set of coherent raw data for each of a plurality of locations included in each of the virtual transmit focal zones, thus obtaining an image of the imaged region, wherein said virtual transmit focal zones are M straight lines in the imaged region, perpendicular to the array of transducers, and wherein said means for synthesizing at least one set of coherent raw data include at least means for computing a coherent raw data set RFcoherent for each of said straight lines by applying delays, corresponding to travel times of ultrasonic waves, to the non-coherent raw data for performing a virtual dynamic transmit focusing on said virtual transmit focal zone, assuming that the speed of sound c is homogeneous in the region, by the following formula:

$$RFcoherent(x_1, x, z) = \sum_\alpha B(\alpha) RFraw(x, \tau(\alpha, x_1, x, z), \alpha),$$

where:

x, z are coordinates, respectively along an axis X of the linear transducer array (2) and along an axis Z perpendicular to the axis X, $x_1$ is a lateral position of one of said straight lines along axis X, α are the respective angles of inclination of the direction propagation of the plane waves with regard to axis Z, RFcoherent($x_1$,x,z) is a set of coherent data corresponding to one straight line of lateral position $x_1$, RFraw(x, τ(a, $x_1$, x, z), α) are data from the sets of raw data RFraw, B(α) is a weighting function for each angle contribution, τ(α, $x_1$, x, z) is a travel time computed according to the following formula:

$$\tau(\alpha, x_1, x, z) = \frac{1}{c}\left[(z\cos\alpha + x_1\sin\alpha) + \sqrt{z^2 + (x - x_1)^2}\right].$$

2. An apparatus for ultrasound imaging, comprising:

means for transmitting a plurality of ultrasonic tilted divergent waves into a region, said ultrasonic tilted divergent waves having different mean angles of inclination of their directions of propagation, for each of a plurality of imaged locations in the region;

means for acquiring respective sets of non-coherent raw data, without receive beamforming, in response to said ultrasonic tilted divergent waves, each set of non-coherent raw data representing the time signals respectively received by an array of transducers in response to the corresponding ultrasonic tilted plane wave;

means for synthesizing at least one set of coherent raw data from the plurality of sets of non-coherent raw data for each of a plurality of virtual transmit focal zones in an imaged region, the at least one set of coherent raw data corresponding to backscattered echoes resulting from said virtual transmit focal zone and being synthesized by coherent addition of said respective sets of non-coherent raw data corresponding to the different mean angles of inclination of the directions of propagation of the ultrasonic tilted divergent waves, for each of a plurality of virtual transmit focal zones in the region;

beamforming means for computing a beamformed signal by receive beamforming along at least one direction using the set of coherent data for each of a plurality of locations included in each of the virtual transmit focal zones, thus obtaining an image of the imaged region, wherein said virtual transmit focal zones are M straight lines in the imaged region, perpendicular to the array of transducers, and wherein said means for synthesizing at least one set of coherent raw data include at least means for computing a coherent raw data set RFcoherent for each of said straight lines by applying delays, corresponding to travel times of ultrasonic waves, to the non-coherent raw data for performing a virtual dynamic transmit focusing on said virtual transmit focal zone, assuming that the speed of sound c is homogeneous in the region, by the following formula:

$$RFcoherent(x_1, x, z) = \sum_\alpha B(\alpha)RFraw(x, \tau(\alpha, x_1, x, z), \alpha),$$

where:

x, z are coordinates, respectively along an axis X of the linear transducer array (2) and along an axis Z perpendicular to the axis X, $x_1$ is a lateral position of one of said straight lines along axis X, α are the respective angles of inclination of the direction propagation of the plane waves with regard to axis Z, RFcoherent($x_1$,x,z) is a set of coherent data corresponding to one straight line of lateral position $x_1$, RFraw(x, τ(α, $x_1$, x, z), α) are data from the sets of raw data RFraw, B(α) is a weighting function for each angle contribution, τ(a, $x_1$, x, z) is a travel time computed according to the following formula:

$$\tau(\alpha, x_1, x, z) = \frac{1}{c}\left[(z\cos\alpha + x_1\sin\alpha) + \sqrt{z^2 + (x - x_1)^2}\right].$$

3. A method for ultrasound imaging comprising at least the following successive steps:

a) a transmission step in which a plurality of ultrasonic tilted plane waves are transmitted into an imaged region and respective sets of non-coherent raw data are acquired, without receive beamforming, by an array of transducers in response to said ultrasonic tilted plane waves, said ultrasonic tilted plane waves having different mean angles of inclination of their directions of propagation, for each of a plurality of imaged locations in the imaged region, each set of non-coherent raw data representing the time signals respectively received by an array of transducers in response to the corresponding ultrasonic tilted plane wave;

b) a coherence enhancing step in which, for each of a plurality of virtual transmit focal zones in the imaged region, at least one set of coherent raw data, corresponding to backscattered echoes resulting from said virtual transmit focal zone, is synthesized from the plurality of sets of non-coherent raw data, the at least one set of coherent raw data being synthesized by coherent addition of said respective sets of raw data corresponding to the different mean angles of inclination of the directions of propagation of the ultrasonic tilted plane waves;

c) a beamforming step in which, for each of a plurality of locations included in each of the virtual transmit focal zones, an image pixel is computed by receive beamforming, using the set of coherent raw data, thus obtaining an image of the imaged region, wherein in the coherence enhancing step b), the virtual transmit focal zones are M straight lines in the imaged region, perpendicular to the array of transducers, wherein the coherence enhancing step c) includes at least a first substep of computing a coherent data set RFcoherent for each of said straight lines by applying delays, corresponding to travel times of ultrasonic waves, to the non-coherent raw data for performing a virtual dynamic transmit focusing on said virtual transmit focal zone, assuming that the speed of sound c is homogeneous in the region, by the following formula:

$$RFcoherent(x_1, x, z) = \sum_\alpha B(\alpha)RFraw(x, \tau(\alpha, x_1, x, z), \alpha),$$

where:

x, z are coordinates, respectively along an axis X of the linear transducer array (2) and along an axis Z perpendicular to the axis X, $x_1$ is a lateral position of one of said straight lines along axis X, α are the respective angles of inclination of the direction propagation of the plane waves with regard to axis Z, RFcoherent($x_1$,x,z) is a set of coherent data corresponding to one straight line of lateral position $x_1$, RFraw(x, τ(a, $x_1$, x, z), α) are data from the sets of raw data RFraw, B(α) is a weighting function for each angle contribution, τ(α, $x_1$, x, z) is a travel time computed according to the following formula:

$$\tau(\alpha, x_1, x, z) = \frac{1}{c}\left[(z\cos\alpha + x_1\sin\alpha) + \sqrt{z^2 + (x-x_1)^2}\right].$$

4. The method according to claim 3, wherein the ultrasonic tilted plane waves are spatio-temporal coded excitations.

5. The method according to claim 3, wherein the coherence enhancing step is performed using a fixed sound speed value.

6. The method according to claim 3, wherein the coherence enhancing step includes a global sound speed value estimation of the imaged region.

7. The method according to claim 3, wherein the coherence enhancing step includes global sound speed estimation for each imaged location of the imaged region.

8. The method according to claim 3, wherein the coherence enhancing step includes phase aberration corrections.

9. The method according to claim 3, wherein in the coherence enhancing step, each virtual transmit focal zone is a straight line perpendicular to the array of transducers.

10. The method according to claim 3, wherein the coherence enhancing step includes:

a first substep of computing a set of coherent raw data for each virtual transmit focal zone by:

applying delays to the raw data of each set of non-coherent raw data for performing a virtual dynamic transmit focusing on said virtual transmit focal zone, assuming that the speed of sound is homogeneous in the region, thus obtaining delayed raw data corresponding to said virtual transmit focal zone, from each set of non-coherent raw data, and coherently adding said delayed raw data from the different sets of non-coherent raw data;

a second substep in which said delays are corrected by an estimation of aberrations in the imaged region based on the set of coherent raw data calculated at the first substep, and the corrected delays are used to compute a new set of coherent raw data by performing a virtual dynamic transmit focusing on said virtual transmit focal zone.

11. The method according to claim 10, wherein at least said second substep is performed several times.

12. The method according to claim 10, wherein in said second substep, the estimation of aberrations is done by cross correlating the coherent raw data corresponding to different transducers in each coherent data set.

13. The method according to claim 3, wherein the coherence enhancing step including includes a second substep in which said travel times τ(a,$x_1$,x,z) are corrected by an estimation of aberrations in the imaged region based on the set of coherent raw data calculated at the first substep, and the corrected travel times τnew(α,$x_1$,x,z) are used to compute a new set of coherent raw data by performing a virtual dynamic transmit focusing on said virtual transmit focal zone with the formula of the first substep wherein τnew(α,$x_1$,x,z) is used as a new value of τ(α,$x_1$,x,z)."

14. A method for ultrasound imaging comprising at least the following successive steps:

a) a transmission step in which a plurality of ultrasonic tilted divergent waves are transmitted into an imaged region and respective sets of non-coherent raw data are acquired, without receive beamforming, by an array of transducers in response to said ultrasonic tilted divergent waves, said ultrasonic tilted divergent waves having different mean angles of inclination of their directions of propagation, for each of a plurality of imaged locations in the region, each set of non-coherent raw data representing the time signals respectively received by an array of transducers in response to the corresponding ultrasonic wave;

b) a coherence enhancing step in which, for each of a plurality of virtual transmit focal zones in the imaged region, at least one set of coherent raw data, corresponding to backscattered echoes resulting from said virtual transmit focal zone, is synthesized from the plurality of sets of non-coherent raw data, the at least one set of coherent raw data being synthesized by coherent addition of said respective sets of non-coherent raw data corresponding to the different mean angles of inclination of the directions of propagation of the ultrasonic tilted divergent waves;

c) a beamforming step in which, for each of a plurality of locations included in each of the virtual transmit focal zones, an image pixel is computed by receive beamforming, using the set of coherent raw data, thus obtaining an image of the imaged region, wherein in the coherence enhancing step b), the virtual transmit focal zones are M straight lines in the imaged region, perpendicular to the array of transducers, wherein the coherence enhancing step c) includes at least a first substep of computing a coherent data set RFcoherent for each of said straight lines by applying delays, corresponding to travel times of ultrasonic waves, to the non-coherent raw data for performing a virtual dynamic transmit focusing on said virtual transmit focal zone, assuming that the speed of sound c is homogeneous in the region, by the following formula:

$$RFcoherent(x_1, x, z) = \sum_{\alpha} B(\alpha) RFraw(x, \tau(\alpha, x_1, x, z), \alpha),$$

where:

x, z are coordinates, respectively along an axis X of the linear transducer array (2) and along an axis Z perpendicular to the axis X, $x_1$ is a lateral position of one of said straight lines along axis X, α are the respective angles of inclination of the direction propagation of the plane waves with regard to axis Z, RFcoherent($x_1$,x,z) is a set of coherent data corresponding to one straight line of lateral position $x_1$, RFraw(x, τ($\alpha$, $x_1$, x, z), α) are data from the sets of raw data RFraw, B(α) is a weighting function for each angle contribution, τ(α, $x_1$, x, z) is a travel time computed according to the following formula:

$$\tau(\alpha, x_1, x, z) = \frac{1}{c}\left[(z\cos\alpha + x_1\sin\alpha) + \sqrt{z^2 + (x-x_1)^2}\right].$$

15. The method according to claim 14, wherein the ultrasonic waves are spatio-temporal coded excitations.

16. The method according to claim 14, wherein the coherence enhancing step is performed using a fixed sound speed value.

17. The method according to claim 14, wherein the coherence enhancing step includes a global sound speed value estimation of the imaged region.

18. The method according to claim 14, wherein the coherence enhancing step includes global sound speed estimation for each imaged location of the region.

19. The method according to claim 14, wherein the coherence enhancing step includes phase aberration corrections.

20. The method according to claim 14, wherein in the coherence enhancing step, each virtual transmit focal zone is a straight line perpendicular to the array of transducers.

21. The method according to claim 14, wherein the coherence enhancing step includes:
    a first substep of computing a coherent data set for each virtual transmit focal zone by:
    applying delays to the raw data of each set of non-coherent raw data for performing a virtual dynamic transmit focusing on said virtual transmit focal zone, assuming that the speed of sound is homogeneous in the imaged region, thus obtaining delayed raw data corresponding to said virtual transmit focal zone, from each set of non-coherent raw data,
    and coherently adding said delayed raw data from the different sets of non-coherent raw data;
    a second substep in which said delays are corrected by an estimation of aberrations in the imaged region based on the set of coherent raw data set calculated at the first substep, to thus obtain corrected delays, and the corrected delays are used to compute a new set of coherent raw data set by performing a virtual dynamic transmit focusing on said virtual transmit focal zone.

22. The method according to claim 21, wherein at least said second substep is performed several times.

23. The method according to claim 21, wherein in said second substep, the estimation of aberrations is done by cross correlating the coherent raw data corresponding to different transducers in each coherent data set.

24. The method according to claim 14, wherein the coherence enhancing step including includes a second substep in which said travel times $\tau(\alpha,x_1,x,z)$ are corrected by an estimation of aberrations in the imaged region based on the set of coherent raw data calculated at the first substep, and the corrected travel times $\tau new(\alpha,x_1,x,z)$ are used to compute a new set of coherent raw data by performing a virtual dynamic transmit focusing on said virtual transmit focal zone with the formula of the first substep wherein $\tau new(\alpha,x_1,x,z)$ is used as a new value of $\tau(\alpha,x_1,x,z)$."

* * * * *

UNITED STATES PATENT AND TRADEMARK OFFICE
CERTIFICATE OF CORRECTION

PATENT NO. : 9,117,439 B2  
APPLICATION NO. : 12/047645  
DATED : August 25, 2015  
INVENTOR(S) : Bercoff et al.

It is certified that error appears in the above-identified patent and that said Letters Patent is hereby corrected as shown below:

On the Title Page, Item (54) and in the Specification, Column 1, lines 1-2 the Title should read: METHOD AND APPARATUS FOR ULTRASOUND SYNTHETIC IMAGING.

In the Claims

Column 9: Line 1, delete "direction" and replace with --direction of--.

Column 10: Line 1, delete "direction" and replace with --direction of--; Lines 27-28, delete "an array" and replace with --said array--; Line 44, (the text) wherein should start a new paragraph in the claim; Line 48, delete "c)" and replace with --b)--.

Column 11: Line 1, delete "direction" and replace with --direction of--; Line 59, delete "step including includes" and replace with --step includes--.

Column 12: Line 13, delete "an array" and replace with --said array--; Line 32, (the text) wherein should start a new paragraph in the claim; Line 36, delete "c)" and replace with --b)--; Line 58, delete "direction" and replace with --direction of--.

Signed and Sealed this  
Nineteenth Day of April, 2016

Michelle K. Lee  
*Director of the United States Patent and Trademark Office*